United States Patent [19]
Spencer et al.

[11] 3,878,206
[45] Apr. 15, 1975

[54] 9-(SUBSTITUTED AMINO)IMIDAZO[4,5-f]QUINOLINES

[75] Inventors: Claude F. Spencer; Harry R. Snyder, Jr., both of Norwich, N.Y.

[73] Assignee: Morton-Norwich Products, Inc., Norwich, N.Y.

[22] Filed: June 6, 1973

[21] Appl. No.: 367,498

[52] U.S. Cl. .................... 260/247.5 EP; 260/288 R
[51] Int. Cl. ............................................ C07d 33/52
[58] Field of Search ................ 260/247.5 EP, 288 R

[56] References Cited
OTHER PUBLICATIONS
Ishiwata et al., Chem. Pharm. Bull., 17, (12), 2455–2460 (1969).

*Primary Examiner*—Lorraine A. Weinberger
*Assistant Examiner*—Richard D. Kelly
*Attorney, Agent, or Firm*—Anthony J. Franze

[57] ABSTRACT

A series of 9-(substituted amino)imidazo[4,5-f]quinolines are antibacterial agents, particularly effective against Haemophilus vaginalis a cause of bacterial vaginitis, and are adapted to be combined in pharmaceutical compositions.

22 Claims, No Drawings

9-(SUBSTITUTED AMINO)IMIDAZO[4,5-f]QUINOLINES

This invention is concerned with a series of 9-(substituted amino) imidazo[4,5-f]quinolines of the formula:

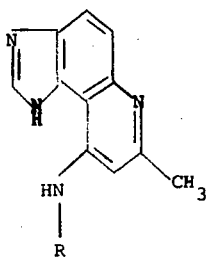

wherein R is 4-ethylphenyl, 4-(2-hydroxyethyl)phenyl, 4-n-dodecylphenyl, 9-anthryl, 4-chlorophenyl, 4-fluorophenyl, 3-chlorophenyl, 4-acetylaminophenyl, 4-(N-methylacetylamino)phenyl, 4-(methylamino)phenyl, 4-aminophenyl, 4-morpholinophenyl, 4-pyrrolidinophenyl, 4-[N-methyl-N-(2-hydroxyethyl)amino]phenyl, 3-chloro-4-morpholinophenyl, 4-hydroxyphenyl, 3-hydroxyphenyl, 3-chloro-4-hydroxyphenyl, 4-carbethoxyphenyl, 4-benzoylphenyl, or 2-methoxy-5-acetylphenyl.

The compounds of this invention are prepared in accordance with methods described in the following examples. They are usually obtained in the form of hydrochloride salts.

EXAMPLE I 9-(p-Ethylanilino)-7-methyl-1H-imidazo[4,5-f]quinoline Hydrochloride A. Ethyl 3-(5-Benzimidazolylamino)crotonate An 82-g (0.5 mole) sampel of 5-nitrobenzimidazole in 900 ml of ethanol was reduced over 4 g of 5 percent Pd/C catalyst containing 50 percent $H_2O$. After filtration of the catalyst, 65 g (0.5 mole) of ethyl acetoacetate, 20 g of anhydrous calcium sulfate, and 0.5 ml of HOAc was added. After filtration, the solution was concentrated in vacuo till a solid remained. The product was filtered and washed with fresh ethanol and air-dried. The yield was 84 g (69 percent), m.p. 160°–162°C.

B. 7-Methyl-9-imidazo[4,5-f]quinolinol 40 g of A. was added to 80 ml of boiling Dowtherm$^{(R)}$ and the boiling was continued for 5 minutes. The product separated upon cooling. The product was filtered, washed with Dowtherm$^{(R)}$ and then acetone and air-dried. The yield was 29 g (91 percent), m.p. 345°–347°C.

C. 9-Chloro-7-methylimidazo[4,5-f]quinoline

Into a 22-1, 4-necked flask set in a tub and equipped with a stirrer, an air condenser (drying tube), thermometer, and dropping funnel was placed $POCl_3$ (4590 ml). B (1062 g, 5.33 moles) was added wtih no heating effect noted. Dimethylformamide (4690 ml) was added dropwise over a 2½ hr period at a rate to control the temperature below 85°. The resulting viscous solution was allowed to stand overnight at room temperature and then added cautiously to ice to a total volume of ca. 50 1. The resulting solution was then adjusted to a pH of 7 to 8 by the addition of NaOHO pellets (9771 g). More ice was added as needed to keep the temperature below 45°. The resulting precipitate was collected by filtration, washed well by stirring in water (3 × 20 l) and dried at 60° to yield 1107 g (95.5 percent).

D. 9-(p-Ethylanilino)-7-methyl-1H-imidazo[4,5-f]quinoline Hydrochloride

A 500 ml, 3-neck, r.b. flask fitted with stirrer, condenser and thermometer was charged with C. (21.7 g, 0.1 mole), p-ethylaniline (12.1 g, 0.1 mole) and ethanol (200 ml). The mixture was stirred and refluxed overnight. The reaction solution was concentrated to dryness by rotary evaporator. The residue was collected and dried at 100°C to yield 34.8 g (103 percent) tan crystals, m.p. 328°–335°C. The crude material (29.3 g) was recrystallized from isopropanol (ca 1000 ml), treated with charcoal and filtered while hot. The filtrate was chilled and the crystals were collected by filtration and dried at 100°C to yield 17.7 g light yellow crystals, m.p. 327°–331°C.

Anal. Calcd. for $C_{19}H_{18}N_4 \cdot HCl$: C, 67.34; H, 5.65; N, 16.54
Found: C, 66.92; H, 5.56; N, 16.48

EXAMPLE II

9-[p-(2-Hydroxyethyl)anilino]-7-methyl-1H-imidazo[4,5-f]-quinoline Hydrochloride A solution of 10.8 g (0.05 m) of the compound of Example I, c. and 6.8 g (0.05 m) of p-aminophenethyl alcohol in 200 ml of ethanol was heated under reflux for 18 hr. After cooling the product was filtered, washed with ethanol and recrystallized from 100 ml of $H_2O$ with charcoal. The pale yellow crystalline product was dried to constant weight in the 60° oven, yielding 14.2 g, m.p. 300°–308°.

Calcd. for $C_{19}H_{18}N_4O \cdot HCl$: C, 64.31, H, 5.40; N, 15.79
Found: C, 63.76; H, 5.36; N, 15.64

EXAMPLE III 9-(p-Dodecylanilino)-7-methyl-1H-imidazo[4,5-f]quinoline Hydrochloride Tetartohydrate A 500 ml, 3-neck, r.b. flask fitted with condenser, stirrer and thermometer was charged with the compound of Example I, C. (21.7 g, 0.1 mole), p-dodecylaniline (26.1 g, 0.1 mole) and ethanol (300 ml) and the mixture was stirred overnight while heating at reflux. The reaction solution was treated with charcoal and filtered while hot. The filtrate was concentrated to dryness by rotary evaporator and the residue was collected and dried to yield 38.6 g (80.6 percent) brown crystals, m.p. 188°–195°C. A small sample (2.0 g) was dissolved in DMF (50 ml), treated with charcoal and filtered while hot and then cooled. The crystals were collected by filtration and dried at 100°C to yield 0.9 g, m.p. 213°–216°C. Another recrystallization gave m.p. 216°–220°C.

Anal. Calcd. for $C_{29}H_{38}N_4 \cdot HCl \cdot \frac{1}{4} H_2O$: C, 72.02; H, 8.23; N, 11.59
Found: C, 72.05; H, 8.32; N, 11.70

EXAMPLE IV

9-[(9-Anthryl)amino]-7-methyl-1H-imidazo[4,5-f]quinoline

Preparation of 9-aminoanthracene:

A mixture of 9-nitroanthracene (22.3 g, 0.1 mole) and dimethylformamide (200 ml) was shaken with hydrogen over ½ teaspoon Raney active nickel catalyst in water. A hydrogen uptake of 26 psi. was recorded (calcd. 25.9 pail). The catalyst was removed by filtration and the fluorescent filtrate was used in part B.

B. Preparation of 9-(aminoanthraceno)-7-methyl-1H-imidazo[4,5-f]quinoline

A mixture of the compound of Example I, C. (16 g, 0.0736 mole) and the filtrate from part A plus an additional 100 ml dimethylformamide was stirred overnight while heating at reflux. The solution was concentrated to about 130 ml by rotary evaporator. The solution was heated, treated with charcoal and filtered while hot. Ether (ca 400 ml) was slowly added to the filtrate and the soluton was chilled. After standing in the ice bath, the crystals which formed which were collected by filtration and dried at 60°C to yield 22.2 g (73.5 percent). The 22.2 g was dissolved in methanol (800 ml), treated with charcoal and filtered while hot. The filtrate was concentrated to 350 ml by rotary evaporator and chilled. The crystals were collected by filtration and dired at 60°C to yield 6.3 g tan crystals, m.p. 194°–204°C.

Anal. Calcd. for $C_{23}H_{18}N_4$: C, 80.19; H, 4.84; N, 14.96
Found: C, 78.53; H, 4.71; N, 14.73

EXAMPLE V 9-(4-Chloroanilino)-7-methyl-1H-imidazol[4,5-f]quinoline Hydrochloride Hydrate A solution of the compound of Example I, C. (44 g., 0.2 mole) and p-chloroaniline (26 g., 0.2 mole) in ethyl alcohol was refluxed for six hours. At the end of this period the solution was filtered and the solvent reduced in volume by evaporation. A solid precipitate formed and was isolated to give 76 g. Recrystallization from ethyl alcohol with charcoal gave 29 g of product.

Calcd. for $C_{17}H_{12}N_4Cl \cdot HCl \cdot H_2O$: C, 59.14; H, 4.09; N, 16.23
Found: C, 58.70; H, 4.24; N, 16.01

EXAMPLE VI 9-(p-Fluoroanilino)-7-methyl-1H-imidazo[4,5-f]quinoline hydrochloride A mixture of 19.5 g (0.09 m) of the compound of Example I, C., 10 g (0.09 m) of p-fluoroaniline and 300 ml of ethanol was stirred and refluxed overnight. The solution was chilled, and the crude product collected by filtration, washed with ether and air-dried to give 22 g. After dissolving the crude product in 1000 ml of ethanol and boiling with charcoal, the filtrate was concentrated to one-half its volume, then chilled. The yield, after oven-drying (100°), was 17 g, m.p. 341°–345° with decomposition.

Anal. Calcd. for $C_{17}H_{13}FN_4 \cdot HCl$: C, 62.10; H, 4.29; N, 17.04; Cl, 10.79
Found: C, 62.56; H, 4.12; N, 17.15; Cl, 10.84

EXAMPLE VII 9-(3-Chloroanilino)-7-methyl-1H-imidazo[4,5-f]quinoline Hydrochloride A 500 ml, 3-neck, r.b. flask fitted with stirrer, condenser and thermometer was charged with a mixture of the compound of Example I, C. (21.7 g, 0.1 mole) and p-chloroaniline (12.7 g, 0.1 mole) in dimethylformamide (200 ml). The mixture was stirred while heating at steam bath temperature overnight. The mixture was concentrated to dryness by rotary evaporator. The residue was collected and dried at 100°C to yield 30.4 g (88 percent) yellow-brown crystals, m.p. 339°–345°C. A 10 g sample was recrystallized from anhydrous methanaol (275 ml), treated with charcoal and filtered while hot. The filtrate was chilled and the crystals were collected by filtration and dried at 100°C to yield 5.5 g yellow crystals, m.p. 347°–355°C. Another recrystallization gave m.p. 351°–353°C.

Anal. Calcd. for $C_{17}H_{13}ClN_4 \cdot HCl$: C, 59.14; H, 4.09; N, 16.23
Found: C, 59.32; H, 4.08; N, 16.04

EXAMPLE VIII 9-(p-Acetamidoanilino)-7-methyl-1H-imidazo[4,5-f]quinoline hydrochloride A mixture of 40 g (0.184 m) of the compound of Example I, C., 27.7 g (0.184 m) of p-aminoacetanilide and 500 ml of ethanol was stirred and refluxed overnight. The solution was concentrated in vacuo to give 51 g of crude product. It was then recrystallized from 3,000 ml of MeOH, with charcoal to give 42 g, m.p. 384°–387°C, with decomposition. A second recrystallization from MeOH, with charcoal, gave m.p. 381°–384°C, with decomposition.

Anal. Calcd. for $C_{19}H_{17}N_5O \cdot HCl$: C, 62.04; H, 4.93; N, 19.04; Cl, 9.64
Found: C, 61.66; H, 4.69; N, 19.06; Cl, 9.51

EXAMPLE IX

9-[p-(N-Methylacetamido)anilino]-7-methyl-1H-imidazo[4,5-f]quinoline Hydrochloride Sesquihydrate A. N-Methyl-4-nitroacetanilide To 500 ml of acetic anhydride was added portionwise, 100 g (0.658) of N-methyl-p-nitroaniline. Following the addition, the solution was heated on a steam bath for 2 hrs, then stirred overnight at room temperature. The white precipitate was collected by filtration, washed with ether and air-dried to give 53 g, m.p. 153°–156°C. The filtrate was concentrated in vacuo to give another 61 g, m.p. 150°–154°C.

B. 9-[p-(N-methylacetamido)anilino]-7-methyl-1-H-imidazo[4,5-f]quinoline Hydrochloride Sesquihydrate A mixture of 114 g (0.587 m) of N-methyl-4-nitroacetanilide (part A) and 800 ml of ethanol was shaken with hydrogen over one teaspoon of Raney active nickel catalyst in water. A pressure drop of 127 psi was recorded (calcd. 118 psi). The catalyst was removed by filtration and the ethanol filtrate refluxed overnight with 127 g (0.587 m) of the compound of Example I, C. The mixture was chilled, filtered, washed with ether and air-dried to give 115 g, m.p. 315°–318°C. The crude product was recrystallized from 4,000 ml of MeOH, with charcoal to yield 75.5 g, m.p. 315°–317°C.

Anal. Calcd. for $C_{20}H_{19}N_5O.HCl.1\frac{1}{2}H_2O$: C, 58.75; H, 5.69; N, 17.13; Cl, 8.67
Found: C, 58.97; H, 5.32; N, 17.33; Cl, 9.27

EXAMPLE X

7-Methyl-9-(p-methylaminoanilino)-1H-imidazo[4,5-f]quinoline Dihydrochloride Monohydrate A solution of 30 g of the compound of Example IX, in 450 ml of conc. HCl was heated under reflux for 4 hr and allowed to cool. The bright yellow crystals which separated were filtered, washed with HCl, air-dried briefly and then suspended in 300 ml of methanol and heated on the steam bath for a few minutes, during which time the yellow color disappeared. The product was filtered, washed with methanol and air dried to give 26 g as white needles which gradually decomposed in a melting point capillary to a dark, semi-liquid mass at 335°.

Anal. Calcd. for $C_{18}H_{17}N_5.2HCl.H_2O$: C, 54.83; H, 5.37; N, 17.76; Cl, 17.98
Found: C, 55.37; H, 5.25; N, 17.71; Cl, 18.31

EXAMPLE XI 9-(p-Aminoanilino)-7-methyl-1H-imidazo[4,5-f]quinoline Hydrochloride A solution of 20 g of the compound of Example VIII in 300 ml of conc. HCl was heated under reflux for 30 min. A clear yellow solution formed after about 15 min; in another 5 min crystals began to separate. After cooling the product was filtered, washed with HCl, then with methanol and air-dried to give 20 g of yellow crystals containing a variable amount of HCl after drying in vacuo. It was therefore converted to the monohydrochloride by the following procedure. a solution of the material in 200 ml of water was made alkaline with $NH_4OH$. The yellow precipitate was filtered, washed with water and suspended in 300 ml of water. One equivalent (4.2 ml) of HCl was added and the mixture was heated on the steam bath, then kept overnight at room temperature. The product was filtered, washed with ethanol and air-dried to give 12 g of material. Recrystallization from 500 ml of water gave 7.5 g of pale yellow needles which darken slowly above ca 350°.

Anal. Calcd. for $C_{17}H_{15}N_5HCl.\frac{1}{2}H_2O$: C, 60.98; H, 5.12; N, 20.92
Found: C, 60.99; H, 5.04; N, 20.99

EXAMPLE XII 9-(4-Morpholinoanilino)-7-methyl-1H-imidazo[4,5-f]quinoline Hydrochloride 1. 4-Morpholinonitrobenzene (34 g, 0.163 mole) and ethanol (200 ml) were placed in a 500 ml reduction bottle. The compound was reduced with hydrogen over one-half teaspoon of Raney active nickel catalyst in water. A hydrogen uptake of 40 psi was recorded (calcd. 41.8 psi). The catalyst was removed by filtration.

2. A 500 ml, 3-neck, r.b. flask fitted with stirrer, condenser and thermometer was charged with the compound of Example I, C. (35.4 g, 0.163 mole). The above filtrate (1) was added and the mixture stirred and refluxed overnight. The reaction mixture was concentrated to dryness by rotary evaporator and the residue was collected and dried to yield 63.9 g (99.5%) dark green crystals, m.p. 364°–374°C. A small sample (10 g) was dissolved in anhydrous methanol (800 ml), treated with charcoal and filtered while hot. Ether (ca 1,000 ml) was added until the filtrate became turbid and the mixture was chilled. The crystals were collected by filtration and dried at 100°C to yield 7.6 g green crystals, m.p. 346°–352°C. A second recrystallization gave m.p. 351°–353°C.

Anal. Calcd. for $C_{21}H_{21}N_5O.HCl$: C, 63.71; H, 5.60; N, 17.69
Found: C, 63.59; H, 5.70; N, 17.43

EXAMPLE XIII 9-(4-Pyrrolidinoanilino)-7-methyl-1H-imidazo[4,5-f]quinoline Hydrochloride 1. Pyrrolidino-4-nitrobenzene (27.4 g, 0.143 mole) and ethanol (200 ml) were placed in a 500 ml reduction bottle. The compound was reduced with hydrogen over one teaspoon of Raney active nickel catalyst in water. A hydrogen uptake of 33 psi was recorded (calcd. 42.3 psi). The catalyst was removed by filtration.

2. A 500 ml, 3-neck, r.b. flask fitted with stirrer, condenser and thermometer was charged with the compound of Example I, C. (31.1 g, 0.143 mole). The above filtrate (1) was added and the mixture was stirred and refluxed overnight. The reaction mixture was concentrated to dryness by rotary evaporator and the residue was collected and dried at 100°C to yield 50.6 g (93.5 percent) tan crystals, m.p. 378°–382°C. A portion (10 g) of the crude material was dissolved in anhydrous methanol (1300 ml) treated with charcoal and filtered while hot. The filtrate was concentrated by rotary evaporator to about ½ volume and then warmed. Ether was added to the warm solution until it became turbid and the mixture was then chilled. The crystals were collected by filtration and dried to yield 7.7 g yellow-brown crystals, m.p. 361°–373°C.

Anal. Calcd. for $C_{21}H_{21}N_5 \cdot HCl$: C, 66.39; H, 5.84; N, 18.44
Found: C, 65.98; H, 5.85; N, 18.17

EXAMPLE XIV

9-{4-[2-hydroxyethyl(methyl)amino]anilino}-7-methyl-1H-imidazo[4,5-f]quinoline Hydrochloride Hemihydrate A. N-(2-Hydroxyethyl)-N-methyl-4-nitroaniline A 500 ml, 3-neck, r.b. flask fitted with condenser, stirrer and thermometer was charged with p-nitrochlorobenzene (39.3 g, 0.25 mole) and N-methylethanolamine (37.5 g, 0.5 mole) and the mixture was heated at 160°–170°C for 3 hr. The reaction mixture was diluted with water (ca 200 ml) and stirred thoroughly. The solid was collected by filtration and recrystallized from ethanol (200 ml), treated with charcoal and filtered while hot. The filtrate was chilled and the crystals were collected by filtration and dried to yield 27 g brown crystals, m.p. 94°–97°C. A small sample (2.0 g) was again recrystallized from ethanol (25 ml), chilled, collected and dried to yield 1.1 g yellow crystals, m.p. 97°–99°C.

Anal. Calcd. for $C_9H_{12}N_2O_3$: C, 55.09; H, 6.16; N, 14.28
Found: C, 55.07; H, 6.13; N, 14.28

B. Preparation of title compound:

1. The compound of A. (23.2 g, 0.119 mole) and ethanol (200 ml) were placed in a 500 ml reduction bottle. The compound was reduced with hydrogen over one teaspoon of Raney active nickel catalyst in water and the catalyst was removed by filtration.

2. A 500 ml, 3-neck, r.b. flask fitted with stirrer, condenser and thermometer was charged with the compound of Example I, C. (25.8 g, 0.119 mole). The above filtrate 1. was added and the mixture was stirred and refluxed overnight. The reaction mixture was concentrated to dryness by rotary evaporator and the residue was collected and dried at 100°C to yield 49.1 g (107.2 percent) yellow green crystals, m.p. 299°–303°C. A portion (10 g) of the material was dissolved in methanol (200 ml), treated with charcoal and filtered while hot. Ether was added until the filtrate became turbid and was then chilled. The crystals were collected by filtration and dried at 100°C to yield 6.7 g dark green crystals, m.p. 300°–304°C.

Anal. Calcd. for $C_{20}H_{21}N_5O \cdot HCl \cdot ½ HCl$: C, 61.13; H, 5.90; N, 17.83
Found: C, 61.48; H, 5.82; N, 17.81

EXAMPLE XV 9-(4-Morpholino-3-chloroanilino)-7-methyl-1H-imidazo[4,5-f]quinoline Hydrochloride Trihydrate A. 3-Chloro-4-morpholinoaniline 2-Chloro-1-morpholino-4-nitrobenzene (19.5 g, 0.0806 mole) was placed in a 500 ml reduction bottle with ethanol (200 ml). The mixture was shaken with hydrogen over ½ teaspoon of Raney active nickel catalyst in water. A hydrogen uptake of 19 psi was recorded (calcd. 20.9 psi). The catalyst was removed by filtration and the filtrate was concentrated to 90 ml by rotary evaporator and chilled. The crystals were collected by filtration and dried at 60°C to yield 10.8 g off white crystals, m.p. 93°–97°C. The filtrate was further concentrated to about 10 ml and chilled. The second crop was collected and dried at 60°C to yield 3.2 g gray crystals, m.p. 92°–93°C. Total yield 14 g (81.8 percent).

Anal. Calcd. for $C_{10}H_{13}ClN_2O$: C, 56.47; H, 6.16; N, 13.17
Found: C, 56.43; H, 6.05; N, 13.19

B. Preparation of title compound:

A 500 ml, 3-neck, r.b. flask fitted with condenser, stirrer and thermometer was charged with a mixture of 3-chloro-4-morpholinoaniline (12.9 g, 0.061 mole), the compound of Example I, C. (13.2 g, 0.061 mole) and dimethylformamide (300 ml). The mixture was heated at 100°C, with stirring, for about 2 hrs when a yellow solid formed. Heating was stopped and the mixture was stirred at room temperature overnight. The reaction mixture was then concentrated to dryness by rotary evaporator. The residue was washed with ether, collected by filtration and dried at 100°C to yield 26.9 g (100.2 percent) yellow crystals. The crude product was dissolved in methanol (800 ml), treated with charcoal and filtered while hot. Ether was added until the filtrate became turbid and was then chilled. The crystals were collected by filtration and dried at 100°C to yield 12.4 g light yellow crystals, melting 320°–327°C (dec).

Anal. Calcd. for $C_{21}H_{20}ClN_5 \cdot 3H_2O$: C, 52.07; H, 5.62; N, 14.46
Found: C, 52.19; H, 5.39; N, 14.42

EXAMPLE XVI 9-(p-Hydroxyanilino)-7-methyl-1H-imidazo[4,5-f]quinoline Hydrochloride Hemihydrate A mixture of 33 g (0.15 mole) of the compound of Example I, C. and 15.5 g (0.15 mole) of p-aminophenol in 1,800 ml of ethanol was refluxed for 6 hr. The solvent was removed by evaporation in vacuo to leave a solid residue. The residue was recrystallized from methyl alcohol. The product was collected as tan needles melting at 390° (dec) in a yield of 24 g (48 percent).

Anal. Calcd. for $C_{17}H_{14}N_4O \cdot HCl \cdot ½ H_2O$: C, 60.81; H, 4.80; N, 16.69
Found: C, 60.55; H, 5.11; N, 16.71

EXAMPLE XVII 9-(m-Hydroxyanilino)-7-methyl-1H-imidazo[4,5-f]quinoline hydrochloride A mixture of 29.9 g (0.138 m) of the compound of Example I, C., 15 g (0.138 m) of m-aminophenol and 200 ml of ethanol was stirred, and refluxed overnight. The solvent was removed by vacuum distillation to give 44 g m.p. 390° with decomposition. The crude product was recrystallized from 5,000 ml of MeOH. The yield after oven-drying (100°) was 33 g, m.p. 389°–391° with decomposition. Recrystallization from MeOH, with charcoal, gave m.p. 396°–398° with decomposition.

Anal. Calcd. for $C_{17}H_{14}N_4O \cdot HCl$: C, 62.48; H, 4.63; N, 17.15; Cl, 10.85
Found: C, 62.18; H, 4.68; N, 16.97; Cl, 11.07

EXAMPLE XVIII 9-(3-Chloro-4-hydroxyanilino)-7-methyl-1H-imidazo[4,5-f]quinoline Hydrochloride A stirred mixture of the compound of Example I, C., (22 g, 0.1 mole) and 3-chloro-4-hydroxyaniline (14 g, 0.1 mole) in 200 ml of dimethylformamide was refluxed for 6 hours. The reaction solution was stripped in vacuo to give 35 g (97 percent) of tan solid which when recrystallized from methanol/ether, melted at 387° dec.

Anal. Calcd. for $C_{17}H_{13}ClN_4O \cdot HCl$: C, 56.52; H, 3.91; N, 15.51
Found: C, 56.25; H, 3.91; N, 15.29

EXAMPLE XIX 9-(4-Carbethoxyanilino)-7-methyl-1H-imidazo[4,5-f]quinoline hydrochloride A mixture of 21.7 g (0.1 m) of the compound of Example I, C., 33 g (0.2 m) of ethyl-p-aminobenzoate and 500 ml of ethanol was stirred and heated at reflux overnight. The solution was concentrated in vacuo to dryness. The yellow semi-solid was dissolved in 500 ml of ethanol. Charcoal was added, the mixture filtered and the filtrate reduced to one-half volume. The yellow solid was collected by filtration, washed with ether and air-dried to give 23 g. Recrystallization from ethanol with charcoal, yielded 22 g, m.p. 275°–280°C.

Anal. Calcd. for $C_{20}H_{16}N_4O_2 \cdot HCl$: C, 62.74; H, 5.00; N, 14.60; Cl, 9.26
Found: C, 62.56; H, 4.88; N, 14.75; Cl, 9.47

EXAMPLE XX 9-(p-Benzoylanilino)-7-methyl-1H-imidazo[4,5-f]quinoline hydrochloride A mixture of 6.51 g of the compound of Example I, C., 5.92 g of 4-amino-benzophenone and 150 ml of ethanol was refluxed with stirring overnight. It was then concentrated in vacuo to give 11.9 g of yellow crystals. The crude product was recrystallized from 200 ml of MeOH, with charcoal, followed by concentration of the filtrate to dryness to yield 11.2 g, m.p. 348°–350°C, after oven-drying (100°C).

Anal. Calcd. for $C_{24}H_{18}N_4O \cdot HCl$: C, 69.48; H, 4.62; N, 13.51; Cl, 8.55
Found: C, 69.03; H, 4.68; N, 13.58; Cl, 8.45

EXAMPLE XXI 9-(5-Acetyl-2-methoxyanilino)-7-methyl-1H-imidazo[4,5-f]quinoline hydrochloride Hemihydrate A mixture of 236 g (0.11 m) of the compound of Example I, C., 18 g (0.04 m) of 3-amino-4-methoxyacetophenone and 200 ml of ethanol was refluxed with stirring overnight. The reaction was chilled, filtered, washed with ether and air-dried to give 62 g, m.p. > 400°C.

Anal. Calcd. for $C_{20}H_{18}N_4O_2 \cdot HCl \cdot \frac{1}{2}H_2O$: C, 61.30; H, 5.14; N, 14.64; Cl, 9.26
Found: C, 61.78; H, 5.41; N, 13.99; Cl, 8.95

The compounds of this invention possess antibacterial qualities. They are particularly noteworthy for their ability to inhibit *Haemophilus vaginalis*, a causative agent of bacterial vaginitis. The table herebelow depicts the ability of these compounds to suppress the growth of that organism as determined using the commonly employed serial dilution technique.

| Compound of Example | Minimum inhibitory concentration: in mcg./ml |
|---|---|
| I | 6.25 |
| II | 25.0 |
| III | 25.0 |
| IV | 50.0 |
| V | 6.25 |
| VI | 3.1 |
| VII | 12.5 |
| VIII | 12.5 |
| IX | 6.25 |
| X | 6.25 |
| XI | 12.5 |
| XII | 25.0 |
| XIII | 12.5 |
| XIV | 25.0 |
| XV | 12.5 |
| XVI | 6.25 |
| XVII | 1.5 |
| XVIII | 6.25 |
| XIX | 25.0 |
| XX | 50.0 |
| XXI | 12.5 |

To provide a carrier for the compounds of this invention various pharmaceutical forms such as sprays, douches, ointments, creams and suppositories can be employed.

What is claimed is:

1. A compound of the formula:

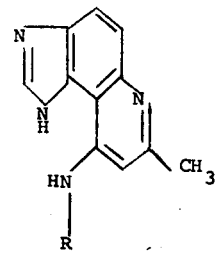

wherein R is 4-ethylphenyl, 4-(2-hydroxyethyl)phenyl, 4-n-dodecylphenyl, 9-anthryl, 4-chlorophenyl, 4-fluorophenyl, 3-chlorophenyl, 4-acetylaminophenyl, 4-(N-methylacetylamino)phenyl, 4-methylaminophenyl, 4-aminophenyl, 4-morpholinophenyl, 4-pyrrolidinophenyl, 4-[N-methyl-N(-2-hydroxyethyl)amino]phenyl, 3-chloro-4-hydroxyphenyl, 4-carbethoxy phenyl, 3-chloro-4-morpholinophenyl, 4-hydroxyphenyl, 3-hydroxyphenyl, 4-benzoylphenyl, or 2-methoxy-5-acetylphenyl.

2. The compound of claim 1 wherein R is 4--ethylphenyl.

3. The compound of claim 1 wherein R is 4-(2-hydroxyethyl)phenyl.

4. The compound of claim 1 wherein R is 4-n-dodecylphenyl.

5. The compound of claim 1 wherein R is 9-anthryl.

6. The compound of claim 1 wherein R is 4-chlorophenyl.

7. The compound of claim 1 wherein R is 4-fluorophenyl.

8. The compound of claim 1 wherein R is 3-chlorophenyl.

9. The compound of claim 1 wherein R is 4-acetylaminophenyl.

10. The compound of claim 1 wherein R is 4-N-(methylacetylamino)phenyl.

11. The compound of claim 1 wherein R is 4-methylaminophenyl.

12. The compound of claim 1 wherein R is 4-aminophenyl.

13. The compound of claim 1 wherein R is 4-morpholinophenyl.

14. The compound of claim 1 wherein R is 4-pyrrolidinophenyl.

15. The compound of claim 1 wherein R is 4-[N-methyl-N-(2-hydroxyethyl)amino]phenyl.

16. The compound of claim 1 wherein R is 3-chloro-4-morpholinophenyl.

17. The compound of claim 1 wherein R is 4-hydroxyphenyl.

18. The compound of claim 1 wherein R is 3-hydroxyphenyl.

19. The compound of claim wherein R is 3-chloro-4-hydroxyphenyl.

20. The compound of claim 1 wherein R is 4-carbethoxyphenyl.

21. The compound of claim 1 wherein R is 4-benzoylphenyl.

22. The compound of claim 1 wherein R is 2-methoxy-5-acetylphenyl.

* * * * *